United States Patent [19]
Dankworth et al.

[11] Patent Number: 6,037,445
[45] Date of Patent: Mar. 14, 2000

[54] PROCESS FOR THE CONTINUOUS PRODUCTION OF FUNCTIONALIZED POLYMERS

[75] Inventors: David C. Dankworth, Whitehouse Station; Chris F. Meyer, Teaneck; William B. Eckstrom, Fanwood; Ramesh R. Hemrajani, Millingtom, all of N.J.; Salvatore Rea, Franklin Square, N.Y.; Jon E. Stanat, Chester, N.J.

[73] Assignees: Exxon Chemical Patents, Inc., Linden, N.J.; Koch-Glitsch, Inc., Teaneck, N.J.

[21] Appl. No.: 09/000,996

[22] Filed: Dec. 30, 1997

[51] Int. Cl.$^7$ .................. C08F 8/00; C08F 6/00; C08G 67/00; C08J 3/00; C07C 67/00

[52] U.S. Cl. .......... 528/480; 528/392; 528/483; 528/487; 528/495; 528/497; 528/499; 525/331.7; 525/333.3; 525/333.7; 525/333.8; 525/333.9; 525/383

[58] Field of Search ............ 528/392, 480, 528/483, 487, 495, 497, 499; 525/333.3, 333.7, 331.7, 333.8, 333.9, 383

[56] References Cited

U.S. PATENT DOCUMENTS

| | | | |
|---|---|---|---|
| 2,831,877 | 4/1958 | Koch | 260/413 |
| 5,409,672 | 4/1995 | Cetinkaya | 422/189 |
| 5,629,434 | 5/1997 | Cusumano et al. | 525/333.3 |
| 5,650,536 | 7/1997 | Dankworth et al. | 560/204 |

OTHER PUBLICATIONS

Meyer, Chris F., "Laminar Flow Static Mixing–Design and Scaleup Criteria", 1991 AIChE Annual Meeting, Los Angeles, Nov. 17–22, 1991: Session 119, Industrial Mixing and Scaleup.

Streiff, F.A. et al., "Don't Overlook Static–Mixer Reactors", Chemical Engineering, Jun. 1994, pp. 76–82.

H. Bahraman, "Koch Reactions", Chapter 5, New Syntheses with Carbon Monoxide, edited by J.Falbe, Springer–Verlag, New York, 1980.

Fleischli, Markus et al., Neue Erkenntnisse zum Mischen und Dispergieren von Flüssigkeiten it grossen Viskositätsunterschieden in statischen Mischern, Chem.–Ing.–Tech., 62 (1990), No. 8, pp650,653 and 654.

*Primary Examiner*—P. Hampton-Hightower
*Attorney, Agent, or Firm*—Ohlandt, Greeley, Ruggiero & Perle

[57] ABSTRACT

A continuous process for functionalizing polymers is disclosed, wherein (A) a liquid comprising the polymer and a gas comprising a functionalizing agent are continuously introduced into a dispersing zone operated in laminar flow with high intensity mixing of the liquid and the gas under functionalization conditions, wherein the mixing is conducted for a period of the dispersing zone residence time at a shear rate effective to form a stable gas-liquid dispersion in which the gas is substantially dissolved or dispersed in the liquid for functionalization, and wherein the shear rate is less than about 5 s$^{-1}$ for no more than about 30% of the residence time; (B) the gas-liquid dispersion is continuously passed to a blending zone operated in laminar flow with low intensity mixing under functionalization conditions, wherein the mixing is conducted at a shear rate effective to further dissolve the gas into the liquid for further functionalization; and (C) continuously recovering functionalized polymer. The process can be used to carbonylate unsaturated polymers, and is particularly useful in reacting unsaturated polymers with carbon monoxide in the presence of a catalyst and a co-reactant selected from water, H$_2$S, alcohols, and thiols to produce functionalized polymer containing carboxylic (thio) acid or carboxylic (thio)ester functional groups.

31 Claims, 1 Drawing Sheet

TUBULAR CARBONYLATION REACTOR

PROCESS FOR THE CONTINUOUS PRODUCTION OF FUNCTIONALIZED POLYMERS

FIELD OF THE INVENTION

The present invention relates to a process for producing functionalized polymers by the continuous reaction of polymers with gaseous functionalizing agents, and particularly relates to the production of carbonylated polymers (e.g., carboxylic acid- and ester-functionalized polymers) by the continuous reaction of unsaturated polymers with carbon monoxide.

The documents referred to throughout the specification are hereby incorporated by reference in their entireties to more fully describe the state of the art to which this invention pertains.

BACKGROUND OF THE INVENTION

The term "polymer" refers herein to materials comprising large molecules built up by the repetition of small, simple chemical units. In a hydrocarbon polymer those units are predominantly formed of hydrogen and carbon. Polymers are defined by average properties, and in the context of the invention polymers have a number average molecular weight ("$\overline{M}_n$") of at least about 500. The term "hydrocarbon" refers herein to non-polymeric compounds comprising hydrogen and carbon having uniform properties such as molecular weight. However, the term "hydrocarbon" is not intended to exclude mixtures of such compounds which individually are characterized by such uniform properties.

Hydrocarbon compounds and hydrocarbon polymers have been reacted to form carboxyl group-containing compounds and polymers and their derivatives. Carboxyl groups have the general formula —CO—OR$^w$, where R$^w$ can be H, a hydrocarbyl group, or a substituted hydrocarbyl group. The synthesis of carboxyl group-containing compounds from olefinic hydrocarbon compounds, carbon monoxide, and water in the presence of metal carbonyls is disclosed in references such as H. Bahrmann, Chapter 5, Koch Reactions, "New Synthesis with Carbon Monoxide", J. Falbe; Springer-Verlag, New York, 1980. Hydrocarbons having olefinic double bonds react in two steps to form carboxylic acid-containing compounds. In the first step an olefin compound reacts with an acid catalyst and carbon monoxide in the absence of water. This is followed by a second step in which the intermediate formed during the first step undergoes hydrolysis or alcoholysis to form a carboxylic acid or ester. An advantage of the Koch reaction is that it can occur at moderate temperatures of –20° C. to +80° C., and pressures up to 100 bar.

The Koch reaction can occur at double bonds where at least one carbon atom in the double bond is di-substituted to form a "neo" acid or ester, such as can be represented by formula:

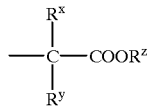

wherein R$^x$ and R$^y$ are the same or different hydrocarbyl groups and R$^z$ is H or hydrocarbyl. The Koch reaction can also occur when both carbons are mono-substituted or one is mono-substituted and one is unsubstituted to form an "iso" acid or ester; e.g., —R$^y$HC—COOR$^z$.

Bahrmann et al. discloses the conversion of isobutylene to isobutyric acid via a Koch-type reaction. U.S. Pat. No. 2,831,877 discloses a multi-phase, acid catalyzed, two-step process for the carboxylation of olefins with carbon monoxide. Complexes of mineral acids in water with BF$_3$ have been studied to carboxylate olefins. Examples of such complexes are H$_2$O•BF$_3$•H$_2$O, H$_3$PO$_4$•BF$_3$•H$_2$O and HF•BF$_3$•H$_2$O. U.S. Pat. No. 3,349,107 discloses processes which use less than a stoichiometric amount of acid as a catalyst.

U.S. Pat. No. 5,629,434 discloses the production of functionalized polymers containing (thio)carboxylic acid or ester groups via the Koch reaction, wherein polymers with $\overline{M}_n$ of at least about 500 and having at least one ethylenic double bond are reacted with carbon monoxide in the presence of an acid catalyst and a nucleophilic trapping agent selected from water, hydroxy containing compounds and thiol containing compounds. U.S. Pat. No. '434 does not disclose the continuous production of functionalized polymers.

U.S. Pat. No. 5,650,536 discloses the continuous production of functionalized polymers via the Koch reaction using a continuous stirred tank reactor or a tubular reactor. U.S. Pat. No. '536 particularly discloses continuously reacting a starting polymer, an acid catalyst such as gaseous BF$_3$, a nucleophilic trapping agent selected from water, alcohols, and thiols, and gaseous carbon monoxide under Koch conditions in a tubular reactor employing in-line mixers spaced at intervals along the length of the reactor to disperse the gas into the liquid and promote reaction. The intervals of open pipe between the mixers provide residence time intervals for reaction ranging from 0.25 to 5 minutes. The in-line mixers can be mechanical mixers or static mixers. U.S. Pat. No. '536 further discloses that the mixer intensity can be relaxed toward the reactor exit, since high gas-liquid contact is primarily required in the front portion of the reactor. Gas dispersing mixers are accordingly preferred in the front end of the reactor, and blending mixers in the back end. It is also disclosed that a preferred embodiment of the process includes a laminar flow process using static mixers where the Reynolds number is very low, preferably less than 10. The disclosed advantages of this reaction scheme, which can be referred to as an intermittently mixed reaction scheme, include short reaction times, high yields, no moving parts or seals (when static mixers are used), no need for liquid level control, and the production of a clean, white product especially where exposure to air and oxygen is avoided.

While suitable for use in many circumstances, the intermittently mixed reaction scheme disclosed in U.S. Pat. No. '536 for the continuous production of functionalized polymers has certain drawbacks. When static mixers provide the intermittent mixing, each mixer is a source of pressure drop, resulting in a relatively steady and significant decrease in reaction pressure from entry to exit of the reaction zone. At some point in the reaction system, the drop in pressure can lead to reduced solubility and dispersibility of the gaseous reactants and agents (e.g., CO and BF$_3$) causing gas-liquid separation and slug flow in the open pipe between mixing zones. The gas-liquid separation results in a lower reactant concentration in the liquid phase which can reduce reaction yield. Slugging adversely affects the performance of the mixers downstream, in essence requiring the mixing/dispersing operation to start over at each intermittent mixer, thereby making less effective use of the pressure drop expended. This decreased mixer effectiveness can reduce reaction rate and yield. Pressure drop can be minimized by the use of larger static mixers and a lower fluid velocity, but this is unattractive because the shear will also be lower, which will limit the effectiveness of the mixer in achieving dispersion of the gas in the liquid.

Furthermore, the intermittently mixed reaction scheme for functionalizing polymers is generally suitable for operation only over a relatively narrow viscosity range. At viscosities above the design range, the pressure drop across the intermittent mixers and tubes can become prohibitively large, while at viscosities below the design range, the gas tends to coalesce rapidly upon exiting the mixers, thus reducing mass transfer rates. This rapid coalescence can be countered to a degree by reducing the average residence time between intermittent mixers, but this typically requires the use of additional mixers at added cost. In any event, because of these limitations, the intermittent scheme is less attractive for certain polymer functionalizations. For example, use of an intermittent reactor scheme designed for operation in a low to medium viscosity range for the functionalization of a relatively high molecular weight polymer at a relatively low reaction temperature (where a low reaction temperature is necessary to minimize side reactions) may not be desirable, because substantial dilution with an inert solvent may be required in order to maintain viscosity within the design range. The use of a large amount of diluent is disadvantageous, because it can require a substantial investment in facilities for storing and handling the diluent and for separating the diluent from the functionalized polymer product.

SUMMARY OF THE INVENTION

The present invention is a process for functionalizing a polymer which comprises (A) continuously introducing a liquid comprising the polymer and a gas comprising a functionalizing agent into a dispersing zone operated in laminar flow with high intensity mixing of the liquid and the gas under functionalization conditions, wherein the mixing is conducted for a period of the dispersing zone residence time at a shear rate effective to form a stable gas-liquid dispersion in which the gas is substantially dissolved or dispersed in the liquid for functionalization, and wherein the shear rate is less than about 5 s$^{-1}$ for no more than about 30% of the residence time; (B) continuously passing the gas-liquid dispersion to a blending zone operated in laminar flow with low intensity mixing under functionalization conditions, wherein the mixing is conducted at a shear rate effective to further dissolve the gas into the liquid for further functionalization; and (C) continuously recovering functionalized polymer.

The continuous process of the invention employs high intensity mixing at the beginning of the reaction in order to dissolve a substantial portion of the gas and to produce a stable dispersion of gas in liquid. Furthermore, the initial high intensity mixing permits the dissolution and/or stable dispersion of a relatively large amount of gas; i.e., the gas can represent up to about 30 volume percent of the total volume of gas and liquid introduced into the dispersing zone. The dispersion has little or no tendency to coalesce, and thus avoids or minimizes the formation of gas slugs and the adverse effects such slugs can have on reaction yield. High yields are possible for a wide range of viscosities and reaction temperatures via the inventive process.

In a preferred aspect of the process of the invention, the shear rate effective to form the stable gas-liquid dispersion in the dispersing zone is at least about 75 s$^{-1}$, preferably in combination with a shear rate of at least about 0.5 s$^{-1}$ in the blending zone. In still another preferred aspect of the process of the invention at least about 80 vol. % of the gas introduced into the dispersing zone is dissolved or dispersed in the liquid before the reaction mixture passes to the blending zone.

In a further aspect of the invention, the functionalization can be conducted in the presence of a catalyst continuously introduced into the dispersing zone. In another aspect, a co-reactant can be continuously introduced into the dispersing zone, the co-reactant forming part of the liquid or gas.

The process of the invention can further comprise continuously passing the liquid-gas solution from the blending zone to a soaking zone operated with essentially no mixing and under functionalization conditions to permit further functionalization before recovering the functionalized polymer.

In another, preferred aspect of the invention, the dispersing zone is a tubular dispersing zone (i.e., forms part of a tubular reactor) comprising at least one static mixer operated in laminar flow and generating a shear rate effective to form a stable gas-liquid dispersion. Preferably, the tubular dispersing zone comprises a plurality of serially disposed, closely spaced static mixers, each operated in laminar flow, wherein at least one of the mixers generates a shear rate effective to form a stable gas-liquid dispersion. Preferably the static mixers have successively smaller diameters and successively higher shear rates from entry to exit of the tubular dispersing zone.

In yet another aspect of the invention, the blending zone is a tubular blending zone comprising at least one static mixer operated in laminar flow and generating a shear rate effective to further dissolve the gas into the liquid for further functionalization. Preferably both the dispersing zone and blending zone are tubular zones forming part or all of a tubular reactor. If a soaking zone is included in the reaction system, it is preferably a tubular soaking zone, optionally but preferably comprising at least one static mixer to promote plug flow.

The process of the invention can be applied to a variety of functionalization reactions involving a polymer in a liquid phase and a gaseous functionalizing agent, such as halogenation (e.g., chlorination with gaseous Cl$_2$), oxidation (e.g., with oxygen or air), ozonization with gaseous O$_3$, and carbonylation with CO. The process is especially suitable for the carbonylation of polymers by continuously reacting an unsaturated polymer (e.g., an unsaturated hydrocarbon polymer), gaseous carbon monoxide, and a co-reactant to produce a polymer substituted with carbonyl-containing functional groups such as carboxylic acid and carboxylic ester groups, wherein the co-reactant is continuously introduced into the dispersing zone together with or separately from the polymer and the CO. Thus, in one aspect, the process of the invention is a process for carbonylating an unsaturated polymer which comprises (A) continuously introducing a liquid comprising the polymer, a gas comprising carbon monoxide, and a co-reactant forming part of the liquid or gas into a dispersing zone operated in laminar flow with mixing of the liquid and the gas under carbonylation conditions, wherein the mixing is conducted for a period of the dispersing zone residence time at a shear rate effective to form a stable gas-liquid dispersion in which the gas is substantially dissolved or dispersed in the liquid for carbonylation, and wherein the shear rate is less than about 5 s$^{-1}$ for no more than about 30% of the residence time; (B) continuously passing the gas-liquid dispersion to a blending zone operated in laminar flow with mixing under carbonylation conditions, wherein the mixing is at a shear rate effective to further dissolve the gas into the liquid for further carbonylation; and (C) continuously recovering carbonylated polymer.

The carbonylation reaction is preferably conducted in the presence of a catalyst continuously introduced into the dispersing zone. In a preferred embodiment, the carbonylation reaction is the Koch reaction conducted in the presence of an acidic catalyst continuously introduced into the dispersing zone. The acidic catalyst can be a Bronsted acid or a Lewis acid, and preferably comprises $BF_3$. The co-reactant preferably comprises a compound of formula $HYR^3$, wherein Y is O or S; and $R^3$ is H, hydrocarbyl or substituted hydrocarbyl, and functionalization of the polymer is by attachment of groups of formula $—CO—YR^3$. The starting polymer preferably comprises unsaturated hydrocarbon polymer. The co-reactant preferably has a $pK_a$ of less than about 12.

The continuous process of the invention is advantageous for relatively fast reactions such as the Koch reaction, because a relatively large amount of gas can be immediately and quickly dissolved and/or stably dispersed into the liquid via high intensity mixing. This either avoids or minimizes mass transfer limitations on the reaction rate in the liquid phase. The intermittently mixed reaction scheme is less satisfactory in this regard in that the mixing and dispersion of the gas occur at periodic intervals, which limit the volume fraction of gas that can be employed and which can lead to gas coalescence between the mixing intervals and thereby to a less than optimum match of mass transfer with demand for gaseous reactants during the reaction.

The continuous process offers a particular advantage for the functionalization of unsaturated polymers via the Koch reaction, because it can minimize the formation of undesirable by-products. When the co-reactant employed in the Koch reaction is a phenol or a substituted phenol, the unsaturated polymer can undergo alkylation with the phenol to form an alkylated phenol by-product. The alkylation can proceed in the absence of carbon monoxide, and can result in significant by-product if the reaction demand for CO is higher than its availability through mass transfer. The continuous process of the invention, by maximizing the mass transfer of gaseous CO, minimizes such by-product formation.

DETAILED DESCRIPTION OF THE INVENTION

Figure 1:
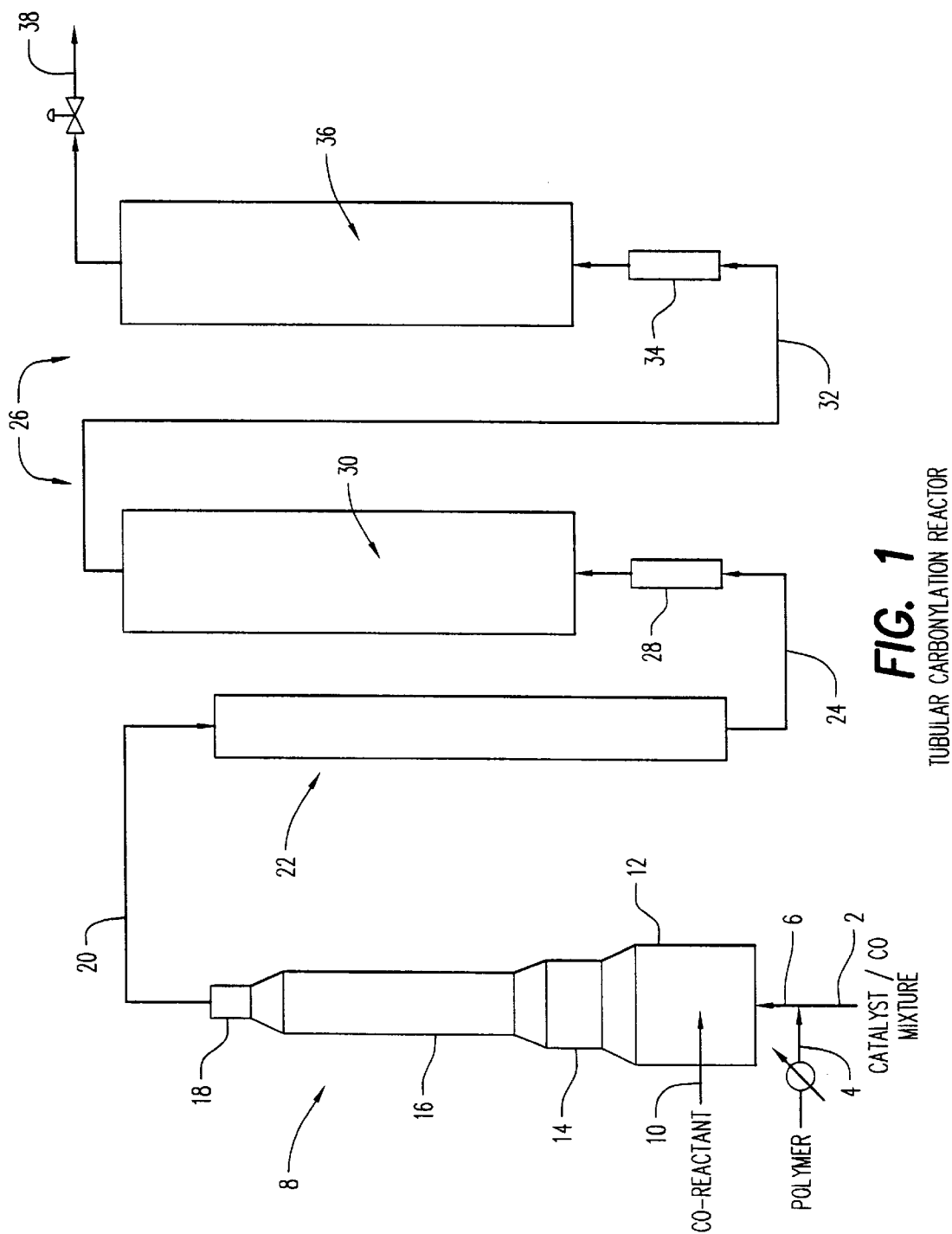
FIG. 1 is a schematic representation of a tubular carbonylation reactor containing a front dispersing zone, an intermediate blending zone, and a back soaking zone.

The present invention relates to the continuous functionalization of polymers (e.g., polymeric olefins) with a gaseous functionalizing agent, and is particularly suitable for carbonylating unsaturated polymers, especially via the Koch reaction. Carbonylated polymer can be produced from an unsaturated polymer containing a non-aromatic carbon-carbon double bond, which can alternatively be referred to as an olefinic bond or an ethylenic double bond. In the Koch reaction, the polymer is carbonylated via the double bond to form a carboxylic acid, thiocarboxylic acid, ester, or thioester. In the continuous process of the invention, as applied to the Koch reaction, a polymer having at least one ethylenic double bond is contacted with an acid catalyst and carbon monoxide in the presence of water, $H_2S$, an alcohol, a thiol, or a mixture thereof as co-reactant, which acts as a nucleophilic trapping agent. The Koch reaction, as further described below, can result in good yields of functionalized polymer, even 90% or greater.

The Koch-functionalized polymer produced by the continuous process of the present invention can be represented as a polymer (e.g., a hydrocarbon polymer) in which functionalization is by attachment of groups of formula:

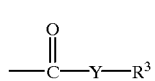

wherein Y is O or S, and $R^3$ is H, hydrocarbyl, or substituted hydrocarbyl. In one embodiment, at least about 50 mole % of the functional groups are attached to a tertiary carbon atom of the polymer (i.e., at least about 50 mole % of the functional groups are "neo" groups). $R^3$ is preferably aryl or substituted hydrocarbyl, and more preferably aryl or substituted aryl.

The Koch reaction is conducted in the absence of reliance on transition metal catalysts. The process of the invention is also suitable for carbonylating unsaturated polymers in the presence of a transition metal catalyst. Thus, for example, the process of the invention can be employed to carbonylate an unsaturated polymer by reacting the polymer with gaseous carbon monoxide and a co-reactant selected from water, $H_2S$, an alcohol, a thiol, and mixtures thereof in the presence of a transition metal catalyst, such as a Group 8 to 10 transition metal compound or complex. In these reactions, the polymer is functionalized by attachment of groups of formula $—CO—YR^3$, as defined in the preceding paragraph. Suitable carbonylation processes involving transition metal catalysts are described, for example, in WO-A-95/21904 and in U.S. Pat. No. 5,691,422.

The process of the invention is also suitable for carbonylating unsaturated polymers via the hydroformylation reaction, wherein the polymer is reacted with carbon monoxide and hydrogen gas as co-reactant in the presence of a transition metal catalyst, such as a cobalt or rhodium carbonyl complex. The hydroformylation reaction proceeds with consumption of carbon-carbon double bonds and the concomitant introduction of aldehyde (—CHO) groups. The carbonylated polymer product accordingly contains polymeric aldehydes. A suitable hydroformylation process is described, for example, in U.S. Ser. No. 662,835, filed Jun. 12, 1996.

Polymers

Polymers suitable for use in the process of the invention include saturated and unsaturated polymers having carbon-carbon backbones. Polymers useful for carbonylation reactions such as the Koch reaction are unsaturated polymers, especially hydrocarbon polymers containing at least one carbon-carbon double bond (olefinic or ethylenic) unsaturation, wherein the maximum number of functional groups per polymer chain is limited by the number of double bonds per chain. Useful polymers in the present invention include polyalkenes including olefin homopolymers, olefin copolymers and mixtures thereof Homopolymers and copolymers include those derived from polymerizable olefin monomers having from 2 to 28 carbon atoms, and more typically from 2 to 6 carbon atoms.

Suitable polymers include the α-olefin polymers made using organo metallic coordination compounds. A preferred class of polymers are ethylene α-olefin ("EAO") copolymers such as those disclosed in U.S. Pat. No. 5,017,299.

The polymer unsaturation can be terminal, internal or both. Preferred polymers have terminal unsaturation. Terminal unsaturation is the unsaturation provided by the last monomer unit located in the polymer. The unsaturation can be located anywhere in this terminal monomer unit. Terminal olefinic groups include vinylidene unsaturation (also referred to in the art as ethenylidene unsaturation), $R^aR^bC=CH_2$; trisubstituted olefin unsaturation, $R^aR^bC=CR^cH$; vinyl unsaturation, $R^aHC=CH_2$; 1,2-disubstituted terminal unsaturation, $R^aHC=CHR^b$; and tetra-substituted terminal unsaturation, $R^aR^bC=CR^cR^d$. At least one of $R^a$ and $R^b$ is a polymeric hydrocarbyl group, and the remaining $R^a$, $R^c$ and $R^d$ are hydrocarbyl groups (e.g., alkyl groups).

Suitable low molecular weight polymers, which may also be referred to as dispersant range molecular weight polymers, are polymers having $\overline{M}_n$ of from about 500 to about 20,000 (e.g., about 700 to about 20,000 and from about 1,000 to about 20,000), preferably from about 700 to about 15,000 (e.g., from about 1,000 to about 15,000), more preferably from about 1,000 to about 10,000 (e.g., from about 1,500 to about 10,000 and from about 2,000 to about 8,000), and most preferably from about 700 to about 5,000 (e.g., from about 1,000 to about 4,000). The number average molecular weights can be determined by vapor phase osmometry or by gel permeation chromatography ("GPC"). Low molecular weight polymers are useful in forming dispersant additives for fuels and lubricating oils.

Suitable medium molecular weight polymers have $\overline{M}_n$'s ranging from about 20,000 to about 200,000, preferably from about 25,000 to about 100,000, and more preferably from about 25,000 to about 80,000, and are useful, for example, as viscosity index improvers in lubricating oil compositions. Medium $\overline{M}_n$'s can be determined by membrane osmometry. Medium molecular weight polymers are useful in forming multifunctional dispersant-viscosity index improver additives for lubricating oils.

The values of the ratio $\overline{M}_w/\overline{M}_n$, referred to as molecular weight distribution ("MWD"), are not critical. However, a minimum $\overline{M}_w/\overline{M}_n$ value of about 1.1 to 2.0 is preferred, and a typical range is about 1.1 to 4.

The olefin monomers are preferably polymerizable terminal olefins; that is, olefins characterized by the presence in their structure of the group $-CR=CH_2$, where R is H or a hydrocarbon group. However, polymerizable internal olefin monomers can also be used to form the polyalkenes. When internal olefin monomers are employed, they normally will be employed with terminal olefins to produce polyalkenes which are copolymers. A particular polymerized olefin monomer which can be classified as both a terminal olefin and an internal olefin is deemed herein to be a terminal olefin. Thus, pentadiene-1,3 (i.e., piperylene) is a terminal olefin.

As the term is used herein, "hydrocarbon polymer" includes polymers (e.g., polyalkenes) which contain non-hydrocarbon substituents, such as $C_1$ to $C_7$ alkoxy, $C_1$ to $C_7$ alkyl mercapto, hydroxy, mercapto, and carbonyl, wherein the non-hydrocarbon moieties do not substantially interfere with the functionalization of the polymer in accordance with the process of this invention. Such substituents typically contribute not more than about 10 wt. % of the total weight of the hydrocarbon polymer (e.g., polyalkene).

The polyalkenes can include aromatic groups and cycloaliphatic groups such as would be obtained from polymerizable cyclic olefins or cycloaliphatic substituted-polymerizable acrylic olefins, but polyalkenes free from aromatic and cycloaliphatic groups are generally preferred. Polyalkene homopolymers and interpolymers derived from terminal hydrocarbon olefins of 2 to 28 carbon atoms are also preferred. This preference is qualified by the proviso that, while copolymers of terminal olefins are usually preferred, copolymers optionally containing up to about 40% of polymer units derived from internal olefins of up to 28 carbon atoms are also within a preferred group. A more preferred class of polyalkenes are those selected from the group consisting of homopolymers and interpolymers of terminal olefins of 2 to 6 carbon atoms, more preferably 2 to 4 carbon atoms. Another preferred class of polyalkenes are the latter, more preferred polyalkenes optionally containing up to about 25% of polymer units derived from internal olefins of up to about 6 carbon atoms.

Specific examples of terminal and internal olefin monomers which can be used to prepare the polyalkenes according to conventional, well-known polymerization techniques include ethylene, propylene, butene-1, butene-2, isobutene, pentene-1, and the like; propylene-tetramer, diisobutylene, isobutylene trimer, butadiene-1,2, butadiene-1,3, pentadiene-1,2, pentadiene-1,3, and the like. Specific examples of polyalkenes include polypropylenes, isobutene homopolymers (i.e., polyisobutylenes), copolymers of isobutene with butene-1 and/or butene-2 (i.e., polybutenes), ethylene-propylene copolymers, ethylene-butene copolymers, propylene-butene copolymers, styrene-isobutene copolymers, isobutene-butadiene-1,3 copolymers, and the like, and terpolymers of isobutene, styrene and piperylene, and copolymer of 80 mole % of ethylene and 20 mole % of propylene. A useful source of polyalkenes are the polybutenes obtained by polymerization of $C_4$ refinery streams having a butene content of about 35 to 75% by weight, and an isobutene content of about 30 to 60% by weight, in the presence of a Lewis acid catalyst such as aluminum trichloride or boron trifluoride.

Also useful are the poly-n-butenes described in U.S. Ser. No. 992,871, filed Dec. 17, 1992. A preferred source of monomer for making poly-n-butenes is petroleum feed streams such as Raffinate II. These feedstocks are disclosed in the art such as in U.S. Pat. No. 4,952,739.

Preferred polymers are EAO copolymers; i.e., polymers of ethylene and at least one α-olefin of formula:

$$H_2C=CHR^e \qquad (II)$$

wherein $R^e$ is straight chain or branched chain alkyl radical comprising 1 to 18 carbon atoms, and especially preferred are the foregoing ethylene α-olefin copolymers wherein the polymer contains a high degree of terminal vinylidene unsaturation. Preferably $R^e$ in the above formula is an alkyl of from 1 to 8 carbon atoms and more preferably is an alkyl of from 1 to 2 carbon atoms. Therefore, suitable comonomers with ethylene include propylene, butene-1, hexene-1, octene-1, and so forth, and mixtures thereof (e.g. mixtures of propylene and butene-1, and the like). Preferred polymers are polymers of ethylene and propylene; of ethylene and butene-1; and of ethylene, propylene, and butene-1.

The polymers can optionally contain units derived from a non-conjugated diene such as dicyclopentadiene, 1,4-hexadiene, and ethylidene norbornene, as well as other such dienes as are well known in the art.

The molar ethylene content of the EAO copolymers employed herein is preferably in the range of from about 20 to about 80%, and more preferably from about 30 to about 70%. When butene-1 is employed as comonomer with ethylene, the ethylene content of such copolymer is preferably from about 20 to about 45 wt % (i.e., from about 33 to about 62 mole % ethylene), although higher or lower ethylene contents may be present. Suitable ethylene-butene-1 copolymers are disclosed in U.S. Pat. No. 5,498,809. A preferred method for making low molecular weight ethylene α-olefin copolymer is described in U.S. Ser. No. 652,185, filed May 23, 1996; which is a continuation of U.S. Ser. No. 260,862, filed Jun. 16, 1994; which is a continuation of U.S. Ser. No. 992,690, filed Dec. 17, 1992, abandoned.

Preferred ranges of number average molecular weights of ethylene α-olefin polymer include the ranges of from about 500 to about 20,000, from about 500 to about 10,000, from about 1,000 to about 8,000, from about 1000 to about 6,000, and from about 1,500 to about 6,000. EAO copolymers in these ranges can be suitable for the production of functionalized polymers via the process of the invention which have utility as dispersants in fuels and lubricating oils. A convenient method for determination of number average molecular weights in these ranges is GPC which additionally provides molecular weight distribution information. Such polymers typically possess an intrinsic viscosity (as measured in tetralin at 135° C.) between about 0.025 and about 0.6 dl/g, preferably between about 0.05 and about 0.5 dl/g, most preferably between about 0.075 and about 0.4 dl/g. EAO copolymers having $\overline{M}_n$'s in the range of from about 20,000 to about 200,000 (e.g., from about 20,000 to about 50,000) are also suitable starting polymers in the process of the invention. Functionalized polymers resulting therefrom can have utility as multifunctional dispersant-viscosity index improvers.

In one aspect, the ethylene a-olefin polymers are further characterized in that up to about 95% and more of the polymer chains possess terminal vinylidene-type unsaturation. Thus, one end of such polymers will be of the formula POLY—C($R^f$)=$CH_2$ wherein $R^f$ is $C_1$ to $C_{18}$ alkyl, preferably $C_1$ to $C_8$ alkyl, and more preferably methyl or ethyl and wherein POLY represents the polymer chain. A minor amount of the polymer chains can contain terminal ethenyl unsaturation, i.e. POLY—CH=$CH_2$, and a portion of the polymers can contain other types of unsaturation, e.g. POLY—CH=CH($R^f$), wherein $R^f$ is as defined above.

The preferred ethylene a-olefin polymers include polymers comprising polymer chains, at least about 30% of which possess terminal vinylidene unsaturation. Preferably at least about 50%, more preferably at least about 60%, and most preferably at least about 75% (e.g. from about 75 to about 98%), of such polymer chains exhibit terminal vinylidene unsaturation. The percentage of polymer chains exhibiting terminal vinylidene unsaturation may be determined by FTIR spectroscopic analysis, titration, proton NMR, or C-13 NMR.

Another preferred class of polymers are α-olefin polymers; i.e., α-olefin homopolymers of an α-olefin of formula $H_2C$=$CHR^e$ and α-olefin copolymers of at least two alpha-olefins of formula $H_2C$=$CHR^e$ wherein $R^e$ is as defined above for formula (II). The preferred alpha-olefin monomers are butene-1 and propylene and preferred α-olefin polymers are polypropylene, polybutene-1 and butene-1-propylene copolymer (e.g., butene-1-propylene copolymers having 5 to 40 mole % propylene). Particularly preferred α-olefin polymers are terminal α-olefin polymers which comprise polymer chains possessing a high degree of terminal vinylidene unsaturation; i.e., at least about 30%, preferably at least about 50%, more preferably at least about 60%, and most preferably at least about 75% (e.g., from about 75 to about 98%) of the chains have terminal vinylidene unsaturation.

The polymers can be prepared by polymerizing monomer mixtures comprising the corresponding monomers (e.g., ethylene with other monomers such as α-olefins, preferably from 3 to 4 carbon atoms) in the presence of a metallocene catalyst system comprising at least one metallocene (e.g., a cyclopentadienyl-transition metal compound) and an activator, e.g. alumoxane compound. The comonomer content can be controlled through selection of the metallocene catalyst component and by controlling the relative amounts of the monomers. Illustrative of the processes which may be employed to make the polymers are those described in U.S. Pat. No. 4,668,834, U.S. Pat. No. 4,704,491, EP-A-128,046, EP-A-129,368, WO-A-87/03887, and U.S. Ser. No. 257, 398, filed Jun. 9, 1994.

The polymer for use in the present invention can include block and tapered copolymers derived from monomers comprising at least one conjugated diene with at least monovinyl aromatic monomer, preferably styrene. Such polymers should not be completely hydrogenated so that the polymeric composition contains olefinic double bonds, preferably at least one bond per molecule. The present invention can also include star polymers as disclosed in patents such as U.S. Pat. No. 5,070,131; U.S. Pat. No. 4,108,945; U.S. Pat. No. 3,711,406; and U.S. Pat. No. 5,049,294.

Another suitable class of polymers for use in the process of the present invention are the polyolefins of ethylene, acyclic olefins (e.g., propylene, 1-butene, 2-butene, 1-pentene, 1-hexene, 1-octene, 1-tetradecene) and/or cyclic olefins (e.g., norbornene and cyclopentene), as described in WO-A-96/23010. These polymers, such as polyethylenes and polypropylenes, are disclosed to have unique structures in terms of their branching, as characterized by the number of branches per 1000 methylene groups in the polyolefin and in the number of ethyl, propyl, butyl, amyl and hexyl or greater branches per 100 methyl branches. WO '010 also describes methods for preparing these polyolefins by polymerization of the corresponding monomers in the presence of selected transition metal compounds (e.g., a transition metal complex of a bidentate ligand) and sometimes co-catalysts.

Co-reactants

Among the carbonylation reactions suitable for use with the process of the invention are those involving reaction of the starting polymer, carbon monoxide, and a co-reactant. The Koch process as practiced herein involves carbonylating at least a portion of the double bond sites in the starting polymer by contacting the polymer with carbon monoxide, an acidic catalyst such as $BF_3$, and a co-reactant selected from water, $H_2S$, alcohols, thiols and mixtures thereof The Koch reaction is conducted in a manner and under conditions such that an acylium cation is formed, and the acylium ion is in turn reacted with the co-reactant (acting as a nucleophilic trapping agent) to form a carboxylic acid group (from water), a thioacid group (from $H_2S$), a carboxylic ester group (from an alcohol), or a carboxylic thioester group (from a thiol).

Co-reactants suitable for use in the Koch reaction include those represented by the formula:

$$HYR^3 \qquad \qquad (III)$$

wherein Y and $R^3$ are as defined above for formula (I). In other words, $HYR^3$ is the acidic species corresponding to the —$YR^3$ group in formula (I). The —$YR^3$ moiety in formula (I) is also a "leaving" group in certain of the derivatization reactions described below (e.g., reaction with amines to form amides) for functionalized polymer produced by the process of the invention, forming thereby $HYR^3$ as a by-product. In a preferred embodiment, $HYR^3$ has a $pK_a$ of less than or equal to about 12, preferably less than about 10, and more preferably less than about 8. The $pK_a$ of $HYR^3$ is determined in water at 25° C. Neo-functionalized polymers (i.e., polymers having a high proportion of neo substituted functional groups) produced via the Koch reaction using these preferred co-reactants have been found to be more reactive towards derivatization with amines.

The co-reactant can be water or $H_2S$, which respectively result in the formation of carboxylic acid or thiocarboxylic acid (—C(=O)SH ) functional groups.

$R^3$ in formula (III) can be alkyl (e.g., methyl, ethyl, propyl, butyl, and the like). Thus, suitable co-reactants include alkanols (e.g., methanol, ethanol, 1- and 2-propanol, the butanols, and the like) and alkane thiols (e.g., methanethiol, ethanethiol, 1- and 2-propanethiol, the butanethiols, and the like).

In a preferred embodiment, the co-reactant of formula (III) has Y=O and $R^3$ selected from the group consisting of substituted alkyls, aryls, substituted aryls and mixtures thereof A substituted alkyl is a linear or branched alkyl group containing at least one electron withdrawing substituent, and preferably at least two electron withdrawing substituents. The alkyl is preferably $C_2$ to $C_{10}$ alkyl, more preferably $C_2$ to $C_8$ alkyl, and most preferably $C_2$ to $C_4$ alkyl. The electron withdrawing substituents are preferably halogen, more preferably F or Cl or combinations thereof, and most preferably F. Other electron withdrawing substituents, such as $NO_2$ and CN, are also suitable, both independently and in combination with halogens and/or with each other. The substituted alkyl can contain electron withdrawing substituents on any one of the carbon atoms of the alkyl group, or on all of the carbon atoms, or any combination thereof, provided that the corresponding alcohol, $R^3OH$, is chemically stable under conditions suitable for preparing functionalized polymer therefrom in accordance with the process of the invention.

In a preferred embodiment, the substituted alkyl represents an alkyl group containing at least one primary or secondary carbon atom in a position beta to the —OH moiety, wherein the beta carbon atom has at least one electron withdrawing substituent group (e.g., fluorine). In other words, the substituted alkyl contains at least one electron withdrawing substituent on a carbon atom once removed from the —OH moiety. More preferably, the primary or secondary beta carbon atom contains more than one electron withdrawing substituent. In this embodiment, where the substituted alkyl contains two or more primary or secondary beta carbon atoms, at least one of the beta carbon atoms contains at least one, and preferably more than one, electron withdrawing substituent. Preferably, each of the beta carbon atoms contains at least one, and preferably more than one, electron withdrawing substituent. Most preferably each beta carbon atom present in the substituted alkyl group is fully substituted with electron withdrawing groups.

The preferred substituted alkyl groups are haloalkyl groups, especially polyhaloalkyl groups (e.g., polychloroalkyl and polyfluoroalkyl groups), and most especially polyfluoroalkyl groups. Particularly preferred polyhaloalkyl groups are those having at least one, and preferably more than one, halogen substituent on the beta carbon atom (or atoms) in the alkyl group. Suitable polyhaloalkyl groups include, but are not limited to, 2,2-difluoroethyl, 2-2-2-trifluoroethyl, 2,2-dichloroethyl, 2,2,2-trichloroethyl, 1,1,1-trifluoroisopropyl, 1,1,1,3,3,3-hexafluoroisopropyl (often more simply referred to as hexafluoroisopropyl), 2,2,3,3,3-pentafluoropropyl, 2-methylhexafluoro-2-propyl and 2-trifluoromethylhexafluoro-2-propyl. A particularly preferred polyhaloalkyl group is hexafluoroisopropyl. Accordingly, hexafluoroisopropanol is a particularly preferred substituted alkyl-type co-reactant.

$R^3$ can be aryl, which, as used herein, is an unsubstituted aromatic which will generally contain from 6 to 10 carbon atoms (e.g., phenyl, naphthyl) or an alkyl substituted aromatic group which will generally contain from 7 to 20 carbon atoms, and more typically from 7 to 12 carbon atoms (e.g., tolyl, m-ethylphenyl, o-ethyltolyl, and m-hexyltolyl).

$R^3$ can also be substituted aryl, which is an aryl group as defined in the preceding paragraph that also contains at least one electron withdrawing substituent. In one preferred embodiment, $R^3$ has the formula:

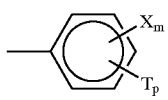

(IV)

wherein X, each of which is the same or different, is an electron withdrawing group; T, each of which is the same or different, is a non-electron withdrawing group (e.g., electron donating); m is an integer from 1 to 5, and p is an integer from 0 to 5. Preferably, m is from 1 to 3. Preferably, p is from 0 to 2, and more preferably 0 to 1. X is preferably selected from halogen (especially F or Cl), $CF_3$, $CH_2CF_3$, CN, and $NO_2$. T is preferably selected from alkyl, especially $C_1$ to $C_6$ alkyl, and most especially from methyl and ethyl.

Among the suitable $R^3$ groups represented by formula (IV) are halophenyls, such as chlorophenyl, fluorophenyl, difluorophenyl, dichlorophenyl, and alkylchlorophenyl (e.g., methylchlorophenyl), and the like. Accordingly, suitable co-reactants include chlorophenol, fluorophenol, difluorophenols, dichlorophenols, and methylchlorophenols. 2,4-Dichlorophenl and 2-chloro-4-methylphenyl are preferred $R^3$ groups for the Koch reaction, and 2-chloro-4-methylphenyl is most preferred. Accordingly, 2,4-dichlorophenol and 2-chloro4-methylphenol are the corresponding preferred substituted aryl-type co-reactants, with 2-chloro-4-methylphenol being most preferred.

The foregoing co-reactants, discussed above in relation to the Koch reaction, are also suitable suitable co-reactants for carbonylation reactions conducted in the presence of a transition metal catalyst.

Production of Functionalized Polymer

The product resulting from the process of the present invention, as applied to carbonylation reactions, is a polymer functionalized by attachment of carbonyl-containing functional groups. With respect to the Koch reaction, the functionalized polymer produced by the process of the present invention can be depicted in general terms by the formula:

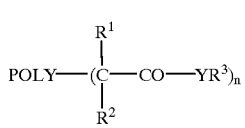

(V)

wherein POLY is a backbone derived from a polymer having a number average molecular weight of at least about 500; n is a number greater than 0; $R^1$ and $R^2$ are independently the same or different and are each H, hydrocarbyl, or polymeric hydrocarbyl; and Y and $R^3$ are as defined in formula (1). The term "polymeric hydrocarbyl" refers to a radical derived from the hydrocarbon polymer which can contain non-hydrocarbon substituents provided the radical is predominantly hydrocarbon in character. Suitable and preferred —$YR^3$ moieties in formula (V) correspond to the —$YR^3$ moieties of the suitable and preferred co-reactants of formula (III) described in the preceding subsection. In a preferred embodiment, $R^1$ and $R^2$ are selected such that in at least about 50 mole %, preferably in at least about 75% (e.g., from about 80 to about 100%), and more preferably in at least about 90% (e.g., from about 95 to about 100%), of the —$CR^1R^2$—groups both $R^1$ and $R^2$ are not H. In other words, in a preferred embodiment, at least about 50 mole %, preferably at least about 75%, and more preferably at least about 90% of the —CO—YR³ groups are "neo" groups.

The subscript n in Formula (V) represents the functionality of the functionalized polymer; i.e., n is the average number of functional groups per polymer chain. Alternatively expressed, n is the average number of moles of functional groups per "mole of polymer", wherein "mole of polymer" refers to the moles of starting polymer used in the functionalization reaction and therefore includes both functionalized and unfunctionalized polymer. Accordingly, the functionalized polymer product can include molecules having no functional groups. n can be determined by ¹³C-NMR. Specific preferred embodiments of n include $1 \geq n > 0$; $2 \geq n > 1$; and $n > 2$. For the functionalized polymer prepared using Koch chemistry as described below, the maximum value of n will be determined by the average number of double bonds per polymer chain in the polymer prior to functionalization.

The functional group in formula (V) is represented by the parenthetical expression —(CR¹R²—CO—YR³), which expression contains the acyl group —CO—YR³. It will be understood that the —CR¹R² moiety is not added to the polymer by the Koch reaction. Strictly speaking, it is the acyl group alone which constitutes the functional group, since it is the group added via the Koch reaction. R¹ and R² represent groups constituting part of the starting polymer; they can be, for example, groups originally present on, or constituting part of, the two carbon atoms bridging the double bond before functionalization. Depending upon the identities of R¹ and R², the —CO—YR³ group can be an iso or a neo acyl group.

Functionalized polymers obtained by carbonylating unsaturated polymer in the presence of a transition metal catalyst can also be represented by formula (V). In one embodiment, the functionalized polymer obtained by these transition metal-catalyzed carbonylations is characterized by having a low neo content (i.e., no more than about 30 mole % neo groups), optionally but preferably in combination with a high content (i.e., at least about 50 mole %) of normal substituted functional groups (i.e., groups attached to a primary carbon atom of the polymer, and represented in formula (V) by R¹=R²=H).

Functionalized polymers obtained by carbonylating unsaturated polymer with hydrogen as co-reactant (i.e., hydroformylation) can be represented as POLY—CR¹R²—CHO, wherein R¹ and R² are as heretofore defined.

The process of the invention, as applied to the Koch reaction, involves reacting (a) at least one polymer (e.g., a hydrocarbon polymer) having a number average molecular weight of at least about 500 and an average of at least one ethylenic double bond per polymer chain; (b) carbon monoxide; (c) at least one acid catalyst, and (d) at least one co-reactant as heretofore described in a manner and under conditions effective to form a functionalized polymer. While not wishing to be bound by any theory, it is believed that addition of the acyl functional group occurs via formation of an acylium cation at the site of a carbenium ion formed by addition of a proton from the acidic catalyst to the carbon-carbon double bond, wherein the acylium cation subsequently reacts with the co-reactant. Aspects of the Koch reaction as practiced herein include conducting the reaction (i) in the absence of reliance on transition metal as a catalyst; (ii) with at least one acid catalyst having a Hammett Scale acidity ("$H_o$") of less than about −7; (iii) such that at least about 40% of the carbon-carbon double bonds present in the starting polymer are functionalized; or (iv) with a co-reactant having a p$K_a$ of less than about 12. The reaction leads to the formation of carbonyl- or thio carbonyl-containing functional groups, which may subsequently be derivatized.

In the Koch reaction, the polymers react with carbon monoxide in the presence of an acid catalyst such as sulfuric acid or BF₃. The preferred catalyst is selected from BF₃ and catalyst complexes of BF₃ with co-reactants HYR³, represented by formula (III) above. Preferred catalyst complexes are those prepared from the preferred co-reactants described above in the subsection entitled "Co-reactants". More particularly, complexes of BF₃ with substituted aryl alcohol co-reactants are preferred, the more preferred being complexes with 2,4-dichlorophenol and with 2-chloro-4-methylphenol, and the most preferred being complexes with 2-chloro-4-methylphenol. The catalyst can be employed by preforming a catalyst complex with the co-reactant or by adding the catalyst and co-reactant separately to the reaction mixture. This latter embodiment has the advantage of eliminating a separate step for making the catalyst complex.

The catalyst or catalyst complex preferably has $H_o$ of less than about −7, and typically from about −8.0 to about −11.5, in order to be sufficiently active. Examples of suitable acidic catalyst and catalyst complex materials with their respective $H_o$ values are as follows: HF, −10.2; BF₃•H₂O, −11.4 to −11.94; AlCl₃, −13.16 to −13.75; and AlCl₃/CuSO₄, −13.75 to −14.52.

The use of H₂SO₄ as a catalyst involves control of the acid concentration to achieve the desired $H_o$ range. Suitable BF₃ catalyst complexes for use in the present invention include those represented by the formula:

$$BF_3 \cdot xHOR^4 \qquad (VI)$$

wherein R⁴ is selected from R³ as defined above for formula (III), —CO—R', —SO₂R', —PO(OH)₂, and mixtures thereof, wherein R' is hydrocarbyl, typically alkyl (e.g., C₁ to C₂₀ alkyl), C₆ to C₁₄ aryl, aralkyl, or alkaryl; and x is from 0.5 to 5.

In transition metal-catalyzed carbonylations, suitable catalysts are typically soluble or otherwise capable of being included in the liquid portion of the reaction mixture and include halides (e.g., chorides), acetates, and nitrates of the transition metals. The catalysts are preferably compounds or complexes of Group 8 to 10 transition metals. Especially suitable are the compounds of cobalt, palladium, rhodium, and iridium. Rhodium and cobalt catalysts are preferred.

Suitable transition metal compounds include the metal carbonyl compounds, such as those selected from the group consisting of iron, cobalt, palladium, rhodium, ruthenium, iridium and osmium. In one aspect, the catalysts consist of transition metal carbonyl hydrides. Some of the carbonyl ligands can be replaced by other ligands such as trivalent phosphorus, trivalent nitrogen, and triorganoarsine and divalent sulfur compounds. Suitable trivalent phosphorus ligands include substituted and unsubstituted triaryl phosphines, diaryl alkyl phosphines, dialkyl aryl phosphines, and trialkyl phosphines.

With respect to hydroformylation, preferred transition metal catalysts are cobalt and rodium carbonyl complexes including, but not limited to, dicarbonyl rhodium acetyacetonate and dicobalt octacarbonyl.

The process of the invention, as applied to carbonylations employing a co-reactant, involves continuously introducing the starting polymer, carbon monoxide, catalyst (optional but preferred), and co-reactant into a dispersing zone under functionalization conditions (i.e., conditions effective to carbonylate the starting polymer), and continuously passing the dispersed reaction mixture to a blending zone under functionalization conditions for further reaction. The starting polymer is typically introduced as a liquid (e.g., by pump), and carbon monoxide is introduced as a gas (e.g., by a compressor). The co-reactant is typically also introduced as a liquid, except for carbonylation by hydroformylation wherein the co-reactant is hydrogen gas. The catalyst can be introduced either as a liquid or a gas. In the Koch reaction, for example, $BF_3$ is typically introduced as a gas, but it can also be introduced in the form of a liquid catalyst complex with the co-reactant. The various gases (i.e., co-reactant, CO, and/or catalyst) can be charged to the dispersing zone separately, or charged together in a gaseous admixture. The gaseous components disperse and dissolve into the liquid in the dispersing zone as the functionalization reaction proceeds.

The polymer can be used neat if the neat polymer results in a liquid of suitable viscosity under the functionalization conditions employed in the dispersing zone. Alternatively, the polymer can be dissolved in an inert diluent (e.g., liquid $C_6$ to $C_{20}$ saturated or aromatic hydrocarbons or liquid saturated $C_1$ to $C_5$ aliphatic dihalogenated hydrocarbons) and introduced as a solution to the dispersing zone, wherein the solution is a liquid under the ftinctionalization conditions employed. As another alternative (preferred in the case of the Koch reaction), the co-reactant can be used in an amount in excess of the stoichiometric amount required for polymer functionalization, such that the agent can perform the additional role of solvent-diluent. When the co-reactant is a liquid, the polymer and co-reactant can be introduced into the dispersing zone separately and thus form a solution-dispersion in situ, or they can be pre-mixed and introduced as a solution-dispersion.

When gaseous $BF_3$ is employed as the catalyst in the Koch reaction, it is preferred to introduce the polymer, CO and $BF_3$ into the dispersing zone first, followed by introduction of the co-reactant after some gas-liquid dispersion has occurred. This post-introduction of co-reactant has been found to promote efficient mass transfer from the gas phase into the liquid for Koch functionalization and, when the co-reactant can be alkylated by the polymer, to promote carbonylation over alkylation.

The liquid in the dispersing zone can contain one or more phases. A multi-phase liquid can occur, for example, due to the finite solubility of the co-reactant in the polymer, resulting in one phase consisting of polymer and a portion of the co-reactant and a second phase containing the balance of the co-reactant. In systems employing a catalyst in addition to polymer and co-reactant, a more complex multi-phase liquid may be present. In any case, the term "liquid" as used herein in reference to the liquid in the dispersing zone is a generic one encompassing single- and multi-phase liquids, and the properties (e.g., viscosity) of the liquid described herein are intended to reflect the liquid as a whole, representing an average of the properties of each phase. The dominant component in the liquid is typically the polymer, and thus the properties of the liquid, whether single or multi-phase, in large measure reflect the properties of the polymer-containing phase(s).

The volume fraction of gas introduced to the dispersing zone relative to the total volume of gas and liquid introduced can be as high as about 30% (e.g., from about 15 to about 30 vol. %), but is typically from about 15 to about 25 vol. %.

The dispersing zone is a zone of high intensity mixing of the liquid and the gas, such that substantially all of the gas introduced therein (i.e., suitably at least about 75 vol. %, typically at least about 80 vol. %, preferably at least about 95 vol. %) of the gas is either dissolved into the liquid or dispersed in the form of bubbles which are sufficiently small that they will have little or no tendency to coalesce as the reaction proceeds. Suitable bubble sizes depend in part upon the viscosity of the liquid (i.e., higher viscosity liquids can support relatively large-sized bubbles with little or no tendency to coalesce), but are typically less than about 3 mm in diameter. Typically, at least about 80 vol. % of the dispersed bubbles are less than about 2 mm (e.g., from about 0.01 to about 2 mm) in diameter, and preferably less than about 1 mm (e.g., from about 0.01 to about 1 mm) in diameter.

The dispersing zone is characterized by having a high shear rate (i.e., a shear rate effective to form a stable gas-liquid dispersion in which a substantial portion of the gas is dissolved or dispersed in the liquid for functionalization) for a period of the dispersing zone residence time. This shear rate is typically at least about 75 $s^{-1}$ (e.g., from about 75 to about 1000 $s^{-1}$), preferably at least about 150 $s^{-1}$ (e.g., from about 150 to about 1000 $s^{-1}$). The time period during which this high shear is maintained in the dispersing zone depends upon such factors as the magnitude of the shear rate employed, the volume percent of the gas introduced into the dispersing zone, the viscosity of the liquid, and the like. The high shear rate is generally maintained for at least about 5% (e.g., from about 5 to about 100%) of the reaction mixture's residence time in the zone, and is typically maintained for at least about 20% (e.g., from about 20 to about 90%) of the reaction mixture's residence time. During other periods, the shear rate is not effective for forming a stable gas-liquid dispersion, but is nonetheless typically at a level effective for promoting contact between the liquid and gas (e.g., breaking the gas up into smaller bubbles and mixing the bubbles into the liquid) and for promoting uniform concentrations in the liquid (e.g., blending trapping agent and polymer). There can be periods of little or no shear in the dispersing zone, provided, however, that the shear rate during mixing is less than about 5 $s^{-1}$ for no more than about 30% of the dispersing zone residence time. Shear rates below about 5 $s^{-1}$ are generally ineffective for promoting gas-liquid contact.

The actual shear rate can vary during the period of high shear, so long as the minimum shear rate is maintained at a level effective to form a stable gas-liquid dispersion. Thus, in one embodiment, the period of high shear is characterized by a shear rate of at least about 75 $s^{-1}$, with shear rates substantially above 75 $s^{-1}$ being generated for at least a portion of the high shear period. For example, shear rates of from about 500 to about 1000 $s^{-1}$ or higher can be generated during this period, although such high rates would typically employed only for a small portion (e.g., less than about 5%) of the total period of high shear.

The period of high shear need not be continuous; i.e., the period of high shear can consist of two or more sub-periods of high shear each separated by an interval or intervals of lower shear or no shear. Thus, for example, two sub-periods having a shear rate of at least about 75 $s^{-1}$ can be separated by a time interval having a shear rate of from about 0 up to 75 $s^{-1}$.

The viscosity of the liquid in the dispersing zone is typically at least about 0.01 Pascal second ("Pa•s") (at least about 10 centipoise—"cP"), preferably from about 0.01 to about 1000 Pa•s (from about 10 to about 1,000,000 cP), and most preferably from about 1 to about 200 Pa•s (from about 1000 to about 200,000 cP).

The dispersing zone is also characterized by being operated in a laminar flow regime, suitably at a relatively low Reynolds number. The Reynolds number is typically less than about 100, and preferably less than about 50 (e.g., from about 0.01 to about 40).

In one embodiment, the dispersing zone is a continuous stirred tank reactor ("CSTR"). In a preferred embodiment, the dispersing zone is in the form of a tubular reactor (also referred to in the art as a pipe reactor); i.e., the dispersing zone is a tubular dispersing zone through which the continuously introduced reaction mixture flows, wherein the dispersing zone comprises at least one static mixer, and preferably a plurality of serially disposed, closely spaced static mixers. By "closely spaced" is meant that the time interval between any pair of mixers represents no more than about 10%, typically no more than about 5%, of the residence time in the dispersing zone and that the sum of all the time intervals between the mixers represents no more than about 25% of the residence time. In a typical case, the time interval between mixers is no more than about 10 seconds (e.g., from about 0.1 to about 5 seconds), the total time interval between all mixers being no more than about 30 seconds, and the dispersing zone residence time is at least about 2 minutes. Type SMX static mixers available from Koch Engineering Company, Inc. are suitable mixers for use in the tubular dispersing zone.

In a particularly preferred embodiment, the static mixers in series have successively smaller diameters generating successively higher shear rates from entry to exit of the tubular dispersing zone, and are preferably arranged vertically with the entry to the zone at the bottom and the exit from the zone at the top. This arrangement has been found to minimize the tendency of the gas to coalesce and form slugs in the dispersing zone and in subsequent reaction zones over a wide range of liquid viscosity. The smaller diameter mixers are required to achieve small bubble size with low viscosity liquids; e.g., liquids with a viscosity of from about 0.01 to about 1 Pa•s (about 10 to about 1000 cP). The larger diameter mixers will break up the gas into bubbles of suitable size to optimize performance of the small mixers, which will reduce the number of smaller diameter mixers required and thus reduce the overall length of the tubular dispersing zone and the overall pressure drop.

In the process of the invention, the gas-liquid dispersion formed in the dispersing zone then passes to a blending zone operated in laminar flow with mixing for further functionalization. Substantially complete dissolution of the gas can occur in the blending zone; i.e., typically at least about 80%, and preferably at least about 90% of the gas will have dissolved in the liquid in the blending zone. Typically from about 95 to 100% of the desired yield is achieved in the blending zone.

High intensity mixing is not required in the blending zone, because the gas-liquid dispersion entering the zone is relatively stable; i.e., the gas bubbles are so small that they will have little or no tendency to coalesce. Low intensity mixing is still required, however, in order to effect further (preferably substantial) dissolution of the gas into the liquid and thus promote further reaction. In one embodiment, the blending zone is characterized by having a shear rate of at least about 0.5 s$^{-1}$. In another embodiment, the shear rate is in the range of from about 0.5 to about 20 s$^{-1}$. Shear rates above 20 s$^{-1}$ can be employed, but are typically not necessary. In a preferred embodiment, the shear rate is from about 1 to about 10 s$^{-1}$ (e.g., from about 1 to about 5 s$^{-1}$).

The blending zone has laminar flow at low Reynolds number; i.e., the Reynolds number is suitably less than about 100, preferably less than about 50, more preferably less than about 25 (e.g., from about 0.01 to about 2 or from about 0.1 to about 20).

The blending zone can be a CSTR equipped with one or more mechanical agitators suitable to provide the required low intensity mixing. The blending zone is preferably a tubular blending zone (e.g., the blending zone of a tubular reactor), which can contain one or more in-line mixers (i.e., mechanical mixers or static mixers) to provide the requisite mixing. Type SMXL static mixers available from Koch Engineering Company, Inc. are suitable, as are Kenics helical mixers available from Chemineer Inc.

The reaction mixture can optionally be passed from the blending zone to a soaking zone operated under functionalization conditions with little or no agitation of the reaction mixture. The use of a soaking zone permits maximum reaction yield for the types and relative amounts of reactants selected and under the reaction conditions employed. The soaking zone can consist of open pipe optionally operated in laminar flow, a packed pipe, or one or more unstirred or gently stirred tank reactors. The soaking zone is operated with very low shear rate, so that essentially no mixing occurs; i.e., the soaking zone typically has a shear rate of less than about 1 s$^{-1}$ (e.g., from about 0.1 to about 0.5 s$^{-1}$). In a preferred embodiment, the soaking zone is a pipe filled with packing to promote uniform flow across the diameter of the pipe (i.e., plug flow). The packing is conveniently a static mixer. The Reynolds number in the soaking zone is typically in the range of from about 0.01 to about 10, and preferably from about 0.02 to about 10 (e.g., from about 0.05 to about 5).

The dispersing, blending, and (optional) soaking zones can be arranged in a variety of ways. In a preferred arrangement, the dispersing zone, blending zone and soaking zone are all tubular (i.e., the zones form sections of a tubular reactor), and preferably all are arranged for vertical flow of the reactants and catalyst; wherein, for example, the dispersing zone has an upflow, the blending zone a downflow, and the soaking zone an upflow. Alternatively, all three zones could be vertically arranged in a single, long tubular unit with upflow. Other suitable arrangements include having any or all of the zones arranged horizontally, with CSTR's optionally employed in place of one or any two or all three of the tubular dispersing, blending and soaking zones.

The relative amounts of reactants and catalyst and the reaction conditions (i.e., functionalization conditions) are typically controlled in a manner sufficient to functionalize at least a portion of the starting polymer. In the carbonylation reactions, reactant and catalyst amounts and reaction conditions are typically controlled so as to functionalize (carbonylate) at least about 40 mole %, preferably at least about 80 mole %, more preferably at least about 90 mole % and most preferably at least about 95 mole % of the carbon-carbon double bonds initially present in the unfunctionalized polymer.

The mole ratio of BF$_3$ to CO introduced into the dispersing zone for Koch functionalizations is suitably from about 0.05 to about 10, typically from about 0.2 to about 5, and preferably from about 0.5 to about 2. In one preferred embodiment, the BF$_3$ to CO mole ratio is from about 0.6 to about 1.5. As described in copending U.S. Ser. No. 09/000, 995, (Docket No. 97L215), filed , Dec. 30, 1997 and entitled "Reactive Ester-Functionalized Polymers", neo ester-functionalized EAO polymers having relatively low steric hindrance and high chemical reactivity can be prepared via the Koch reaction using a BF$_3$ to CO mole ratio in this range.

In transition metal-catalyzed carbonylations, the transition metal concentration is typically in the range of from about 0.01 to about 5 wt. % based on the starting polymer.

Optimum concentrations will depend primarily on the metal employed. Cobalt concentrations typically range from about 0.1 to 5 wt. %. Rhodium concentrations typically range from about 0.01 to 0.1 wt. %. Other factors determining the optimum catalyst concentration include the concentration and type of unsaturation (e.g., terminal v. internal) and the desired degree of conversion. For complete conversion of hydrocarbon polymers containing a substantial proportion of internal olefins, a higher catalyst concentration is needed.

The amount of co-reactant introduced into the dispersing zone can be any amount sufficient to functionalize at least a portion of the starting polymer. In the Koch reaction, the amount of co-reactant is typically at least about the stoichiometric amount required to react with the acylium cations. As noted earlier, in a preferred embodiment, an excess of co-reactant can be used over the stoichiometric amount, such that the agent performs the dual role of reactant and diluent for the reaction. However, the amount of co-reactant employed must be controlled so as not to dilute the acid catalyst to the point that $H_o$ is adversely affected; i.e., so as not to result in systems having insufficient acid strength (e.g., systems with $H_o$ greater than about −7).

The amount of carbon monoxide charged to the reaction can be any amount sufficient to functionalize at least a portion of the starting polymer, but is typically at least the amount required to react with substantially all of the carbon-carbon double bonds available for functionalization, and is preferably an amount in excess of the stoichiometric amount. Accordingly, carbon monoxide is suitably used in an amount of at least about 0.5 mole (e.g., from about 1 to about 5 moles), and typically at least about 1.5 moles (e.g., from about 1.5 to about 3 moles) per mole of carbon-carbon double bonds in the starting polymer.

In transition-metal catalyzed carbonylations other than hydroformylations, the carbon monoxide typically contains up to about 10 mole % hydrogen (i.e., from about 0 to 10 mole % hydrogen) and preferably contains from about 1 to about 10 mole % hydrogen, wherein the balance (allowing for the presence of minor amounts of impurities) is CO. In carbonylations via the hydroformylation reaction, the $H_2$ to CO molar ratio is suitably from about 1:3 to about 3:1, preferably from about 1:2 to about 2:1, and most preferably about 1:1.

The reaction temperature for Koch carbonylations is suitably in a range of from about from about −20 to about 100° C., preferably from about 15° C. to about 65° C., and more preferably from about 20° C. to about 55° C. The temperature for transition metal-catalyzed carbonylations is typically in a range of from about 20 to about 300° C., and more typically from about 25 to about 250° C. Temperature can be controlled by heating and cooling means applied to the reactor. Since the Koch reaction is exothermic, a cooling means might be required. In one embodiment of the Koch reaction, however, one or more of the liquid-phase reactants (e.g., the polymer and the alcohol co-reactant) can first be cooled to a pre-selected temperature below the desired reaction temperature, and then charged to an adiabatic dispersing zone where they are warmed by the heat of reaction alone (i.e., no external heating) to the maximum desired reaction temperature.

The initial system operating pressure is suitably up to about 138,000 kPa (up to about 20,000 psig) and is typically at least about 2,070 kPa (at least about 300 psig), preferably at least about 5,520 kPa (at least about 800 psig), and most preferably at least about 6,900 kPa (at least about 1,000 psig). The initial operating pressure is suitably in the range of from about 3,450 to about 34,500 kPa (from about 500 to about 5,000 psig), typically from about 4,485 to about 20,700 kPa (from about 650 to about 3,000 psig), preferably from about 4,485 to about 13,800 kPa (from about 650 to about 2,000 psig). The desired operating pressure is typically achieved by controlled use of a high pressure carbon monoxide source and/or by high pressure liquid pumps for the polymer and the co-reactant. An exception is hydroformylation, wherein the desired operating pressure involves controlled use of high pressure CO and $H_2$ sources. Operating pressure will typically decrease to some extent as the reaction mixture flows through the dispersing zone and blending zone (e.g., pressure drops typically occur with the use of static mixers), but in-line pumps can be employed to restore the pressure to initial levels if desired.

The total residence time in the dispersing and blending zones is suitably no more than about 60 minutes. The residence time in the dispersing zone is suitably no more than about 20 minutes, typically no more than about 15 minutes (e.g., from about 1 to about 10 minutes), preferably no more than about 10 minutes (e.g., from about 1 to about 8 minutes), and most preferably no more than about 5 minutes (e.g., from about 1 to about 3 minutes). The residence time in the blending zone is suitably no more than about 40 minutes (e.g., from about 5 to about 35 minutes), typically no more than about 20 minutes (e.g., from about 5 to about 15 minutes), and preferably no more than about 15 minutes (e.g., from about 5 to about 10 minutes). If an optional soaking zone is included, the residence time in the soaking zone is suitably no more than about 120 minutes, typically no more than about 60 minutes, and preferably no more than about 40 minutes (e.g., from about 10 to about 40 minutes). It is to be understood that the foregoing residence times are meant to be representative only, and that longer or shorter residence times can be used as necessary for the particular reactants and reaction conditions employed.

Upon exiting from the reaction system, the functionalized polymer product is typically separated from the catalyst and unconsumed reactants. Unreacted CO can be flashed off. When $BF_3$ is employed as the catalyst, it is typically also released from the reaction mixture by flashing. The CO and $BF_3$ so released can then be recycled to the dispersing zone.

The procedure employed to recover Koch-functionalized polymer depends upon the particular reactants employed; i.e., the functionalized polymer-containing reaction mixture can be a single phase, a combination of partitionable polymer and acid phases, or an emulsion with either the polymer phase or the acid phase being the continuous phase. In some cases it is necessary to quickly separate or neutralize catalyst components upon recovery of product to avoid reversion of the desired functionalized product to starting material or other by-product, such as—in the case of $BF_3$—by rapidly lowering pressure and increasing temperature to promote release of the catalyst as a gas, or by quenching the catalyst with excess alcohol or neutralizing agent. When the mixture is an emulsion, fluoride salts, such as sodium or ammonium fluoride in combination with an alcohol such as butanol or methanol, can be used to neutralize the catalyst and phase separate the reaction complex. The fluoride ion helps trap the $BF_3$ complexed to the functionalized polymer and helps break emulsions generated when the crude product is washed with water. Alcohols such as methanol and butanol and commercial demulsifiers also help to break emulsions, especially in combination with fluoride ions. Preferably, the co-reactant is combined with the fluoride salt, when alcohols are used to separate polymers. The presence of the co-reactant as a solvent avoids or minimizes derivatization (e.g., trans-esterification) of functionalized product by the alcohols used to break the emulsion.

Where the HYR$^3$ co-reactant has a p$K_a$ of less than about 12, the Koch-functionalized polymer can be separated from the unconsumed co-reactant and BF$_3$ catalyst by depressurization and distillation. It has been found that the BF$_3$ catalyst releases more easily from reaction mixtures containing co-reactants with relatively low p$K_a$'S.

For transition metal-catalyzed carbonylations, the functionalized hydrocarbon polymer product can be recovered by any of a variety of methods available in the art. The catalyst can be removed by such known techniques as washing the product with water or with aqueous alkali or acid, distilling or stripping the catalyst from the product (e.g., stripping a hydridocobalt tetracarbonyl catalyst in the presence of a stabilizing mixture of carbon monoxide and H$_2$ at a temperature in the range from room temperature to 100° C.), oxidizing the catalyst to form a salt and then extracting the salt in aqueous solution, and stripping the product with a hydrogen-containing gas to reduce and thereby deposit the catalyst metal on the packing or walls of a recovery zone. An especially suitable technique for use in removing cobalt catalysts is the so-called "cobalt flash" technique described in U.S. Pat. No. 4,625,067, in which the product is contacted with a stream of stripping gas such as synthesis gas to entrain volatile Co compounds wherein the stripping is done in the presence of water or aqueous acid to dissolve Co not entrained at the stripping temperature and pressure employed. Of course, the selected technique must be operated under conditions which avoid or minimize decomposition or other chemical modification of the desired polymer product. The choice of such operating conditions is within the capability of the person of ordinary skill in the art.

The reaction yield can be determined upon completion of the reaction by separating the polar functionalized polymer from the non-polar unfunctionalized polymer, using standard techniques such as chromatography. The conversion of carbon-carbon double bonds in the starting polymer can be determined using $^{13}$C-NMR.

FIG. 1 is a schematic representation of a tubular carbonylation reactor suitable for practicing the process of the invention, configured for carbonylating polymers via the Koch reaction. Polymer, optionally diluted with inert solvent, is pumped via line 4 into line 6 and there combined with a mixture of carbon monoxide and a gaseous catalyst (e.g., BF$_3$) being fed to line 6 via line 2. The mixture of polymer, CO and catalyst is then fed to the front end of dispersing zone 8 via line 6. The dispersing zone consists of four closely spaced static mixers 12, 14, 16 and 18 arranged vertically, the mixers having successively smaller diameters. Co-reactant is introduced via line 10 into first static mixer 12 downstream from the introduction of polymer, CO and catalyst and after some dispersion of the gas into the polymer has occurred. The reaction mass flows upward through the dispersing zone through each of the four static mixers 12, 14, 16 and 18. Dispersing zone 8 is operated in laminar flow and with high intensity mixing, such that the reaction mass exiting the dispersing zone comprises a dispersion of relatively small, non-coalescing gas bubbles in a liquid medium. The gas-liquid dispersion then flows through line 20 to blending zone 22, which consists of a vertically arranged static mixer operated in laminar flow with low intensity mixing. The reaction mixture flows downward through the blending zone and passes via line 24 into soaking zone 26, wherein the reaction mixture flows upward through a relatively short, small diameter static mixer 28 and a relatively long, wide diameter static mixer 30 and then flows upward through a second set of such mixers, 34 and 36 respectively, via line 32. The reaction mixture then exits the soaking zone and the carbonylation reactor through line 38 and flows to, for example, a flashing unit to remove unconsumed CO gas and gaseous catalyst from the mixture. Pressure drops occurring across the static mixers in the dispersing zone can be offset by the use of one or more booster pumps after the dispersing zone.

The polymer, CO and catalyst may each be introduced separately into dispersing zone 8. The co-reactant may be fed concurrently with the other components; e.g., in admixture with the polymer or separately therefrom. The volume fraction of gas introduced to the dispersing zone relative to the total volume of gas and liquid introduced can be as high as about 30%, but is typically from about 15 to about 25 vol. %. Temperature may be controlled by precooling feeds and allowing the heat of reaction to bring temperature up to the desired temperature or by preheating the feed and using cooling jackets. Functionalization conditions are typically maintained throughout the carbonylation reactor. Residence time is controlled by the flow rate in and capacity of the reactor. The cumulative residence time is typically from about 2 to about 10 minutes in the dispersing zone, from about 5 to 20 minutes in the dispersing and blending zones, and from about 15 to about 90 minutes in all three zones. The foregoing description may not be suitable for all operations.

Despite the focus in this section on carbonylating unsaturated polymers especially via the Koch reaction, it is to be understood that the process of the invention can be applied to, and the foregoing description can be extended to, other functionalization chemistries involving a polymer and a gaseous functionalizing agent (e.g., halogenation, oxidation, and ozonization), optionally in the presence of a catalyst and/or a co-reactant.

The carboxylic acid and ester-functionalized polymers produced by the process of the present invention from polymer, CO and co-reactant can be derivatized with nucleophilic reactant compounds including, but not limited to, amines, amino alcohols, alcohols, reactive metals, and reactive metal compounds. Derivatives with amine compounds and polyamine compounds such as alkylene polyamines can be prepared by condensing the functionalized polymer with the amine to obtain N-containing derivatives such as amides. These derivatives can then be post-treated with post-treating agents such as urea, thiourea, carbon disulfide, aldehydes, inorganic acids, carboxylic acids, dicarboxylic acid anhydrides, hydrocarbyl substituted succinic anhydrides, nitriles, epoxides, boron compounds, phosphorus compounds and the like. Further description of the types of derivatives and post-treated derivatives which may be obtained from the functionalized polymer produced by the process of the present invention and the methods which may be employed to prepare them can be found in U.S. Pat. No. 5,629,434. The disclosure in U.S. Pat. No. '434 concerning derivatives and post-treated derivatives of Koch-functionalized polymers may be applied to the functionalized product described herein.

The polymeric aldehydes produced by the process of the invention via the hydroformylation reaction can be converted to alcohols (e.g., by hydrogenation) or amines (e.g., by reductive amination).

The functionalized polymers produced by the process of the invention and derivatives and post-treated derivatives thereof find use as additives (e.g., dispersant additives) in fuels and in lubricating oils. The disclosure in U.S. Pat. No. '434 concerning fuel and lubricating oil compositions and concentrates based upon Koch-functionalized polymers and (post-treated) derivatives thereof may be applied to the functionalized product described herein and its (post-treated) derivatives.

EXAMPLES

The examples provided below serve only to illustrate the invention, and are not intended to limit the invention's scope. The number average molecular weights and ethylene contents reported for the ethylene-butene-1 ("EB") polymers in the following examples were determined via $^{13}$C-NMR.

Example 1

A continuous process was carried out in a pipe reactor consisting of four closely spaced SMX-type static mixers in a dispersing section, which ranged in size from a 5.08 cm (2 inch) diameter-16 element mixer to a 1.27 cm (0.5 inch) diameter-6 element mixer. The dispersing section was followed by a blending section with a type SMXL mixer of 3.8 cm (1.5 inches) in diameter and 1.52 m (5 feet) in length, and a soaking section consisting of two SMX mixers, each 10.2 cm (4 inches) in diameter and 2.74 m (9 feet) in length. Additional small mixers, each 2.54 cm (1 inch) in diameter with 12 elements, were located at the feed to each SMX mixer in the soaking section.

Ethylene-butene-1 polymer ($\overline{M}_n$ of about 2000, 25 wt. % ethylene content) was fed to the reactor at a flow rate of about 40 kg/hour. 2-chloro-4-methylphenol ("CMP") was separately fed to the reactor in an amount equivalent to 7.5 wt. %, based on the total weight of polymer and CMP. The feed temperature was about 40° C. Mixed $BF_3$ and CO were fed through a recycle compressor at a $BF_3$ to CO mole ratio of 0.19. The $BF_3$ to CMP mole ratio was 0.34. The viscosity of the liquid phase was initially about 9.0 Pa·s (9000 cP) and thereafter decreased to a level of about 1 Pa·s (1000 cP). The shear rates in the four static mixers in the dispersing section were respectively about 11 s$^{-1}$, about 32 s$^{-1}$, about 120 s$^{-1}$, and about 800 s$^{-1}$. Shear rate in the blending section was between about 1 to about 2 s$^{-1}$, and in the soaking section between about 0.25 to about 0.5 s$^{-1}$. The reactor residence time was 49 minutes and the maximum temperature during the reaction was 51° C. The residence time in the dispersing section was 2.5 minutes, and the time intervals between mixers in the dispersing section were between 1 and 10 seconds. Initial system pressure was about 12,420 kPa (1800 psig). $BF_3$ and unconsumed CO were removed from the polymer product by flashing and recycled to the reactor inlet. Unconsumed CMP was separated by evaporation and also recycled. Steady state operation provided a product having 86 wt. % active ingredient (i.e., weight percent of functionalized polymer relative to the weight of both functionalized and unfunctionalized EB polymer in the product), as determined by chromatography. The active portion of the product was essentially 100% neo 2-chloro-4-methylphenyl ester functionalized EB polymer, as determined by $^{13}$C-NMR.

Examples 2–4

A series of 2-chloro-4-methylphenyl ester functionalized EB polymer products (all 100% neo esters) were prepared via a continuous carbonylation process using a reactor as described in Example 1. The reaction parameters employed were as follows:

| Process: | Example 2[1] | Example 3[2] | Example 4[2] |
|---|---|---|---|
| $M_n$ of EB polymer | 2000 | 3500 | 3800 |
| Wt. % ethylene of EB polymer | 25 | 45 | 45 |
| Flow rate of EB polymer (kg/hr) | 40 | 40 | 40 |
| Wt. % CMP | 7.5 | 6 | 5 |
| Feed temperature (° C.) | 14.7 | 24 | 35 |
| Maximum Rx temperature (° C.) | 43 | 35 | 44 |
| $BF_3$/CO mole ratio | 0.92 | 0.31 | 0.9 |
| $BF_3$/CMP mole ratio | 1.31 | 1.0 | 1.0 |
| Reactor residence time (min) | 49 | 49 | 49 |
| Dispersing section residence time[3] (min) | 2.5 | 2.5 | 2.5 |
| Initial system pressure (kPa, psig) | 12,420 (1800) | 12,420 (1800) | 11,730 (1700) |
| Active ingredient (wt. %) | 89 | 85 | 86 |

[1]Values for liquid viscosity and shear rates were approximately the same as in Example 1.
[2]The viscosity of the liquid was initially about 60 Pa·s (60,000 cP) and thereafter decreased to a level of about 15 Pa·s (15,000 cP). The shear rates were approximately the same as in Example 1.
[3]The time intervals between static mixers in the dispersing section were between 1 and 10 seconds.

What is claimed is:

1. A process for functionalizing a polymer which comprises:
   (A) continuously introducing a liquid comprising the polymer and a gas comprising a functionalizing agent into a dispersing zone operated in larmnar flow with high intensity mixing of the liquid and the gas under functionalization conditions, wherein the mixing is conducted for a period of the dispersing zone residence time at a shear rate effective to form a stable gas-liquid dispersion in which the gas is substantially dissolved or dispersed in the liquid for functionalization, and wherein the shear rate is less than about 5 s$^{-1}$ for no more than about 30% of the residence time;
   (B) continuously passing the gas-liquid dispersion to a blending zone operated in laminar flow with low intensity mixing under functionalization conditions, wherein the mixing is conducted at a shear rate effective to further dissolve the gas into the liquid for further functionalization; and
   (C) continuously recovering functionalized polymer.

2. The process according to claim 1, wherein the shear rate effective to form the stable gas-liquid dispersion in the dispersing zone is at least about 75 s$^{-1}$.

3. The process according to claim 2, wherein the shear rate in the blending zone is at least about 0.5 s$^{-1}$.

4. The process according to claim 1, wherein at least about 80% of the gas is dissolved or dispersed in the liquid in the dispersing zone.

5. The process according to claim 1, wherein the gas introduced into the dispersing zone is in an amount of from about 15 to about 30 vol. %, based on the total volume of liquid and gas.

6. The process according to claim 1, wherein the functionalization is conducted in the presence of a catalyst continuously introduced into the dispersing zone.

7. The process according to claim 1, wherein a co-reactant is continuously introduced into the dispersing zone, the co-reactant forming part of the liquid or gas.

8. The process according to claim 1, wherein the dispersing zone is a tubular dispersing zone comprising at least one static mixer.

9. The process according to claim 8, wherein the blending zone is a tubular blending zone comprising at least one static mixer.

10. The process according to claim 1, wherein the dispersing zone is a tubular dispersing zone comprising a plurality of serially disposed, closely spaced static mixers.

11. The process according to claim 10, wherein the static mixers are mixers having successively smaller diameters from entry to exit of the tubular dispersing zone.

12. The process according to claim 1, further comprising continuously passing the liquid-gas solution from the blending zone to a soaking zone operated with essentially no mixing and under functionalization conditions to permit further functionalization before recovering the functionalized polymer.

13. A process for carbonylating an unsaturated polymer which comprises:
(A) continuously introducing a liquid comprising the polymer, a gas comprising carbon monoxide, and a co-reactant forming part of the liquid or gas into a dispersing zone operated in laminar flow with high intensity mixing of the liquid and the gas under carbonylation conditions, wherein the mixing is conducted for a period of the dispersing zone residence time at a shear rate effective to form a stable gas-liquid dispersion in which the gas is substantially dissolved or dispersed in the liquid for carbonylation, and wherein the shear rate is less than about 5 s$^{-1}$ for no more than about 30% of the residence time;
(B) continuously passing the gas-liquid dispersion to a blending zone operated in laminar flow with low intensity mixing under carbonylation conditions, wherein the mixing is at a shear rate effective to further dissolve the gas into the liquid for further carbonylation; and
(C) continuously recovering carbonylated polymer.

14. The process according to claim 13, wherein the shear rate effective to form the stable gas-liquid dispersion is at least about 75 s$^{-1}$.

15. The process according to claim 14, wherein the shear rate in the blending zone is at least about 0.5 s$^{-1}$.

16. The process according to claim 13, wherein at least about 80% of the gas is dissolved or dispersed in the liquid in the dispersing zone.

17. The process according to claim 13, wherein the gas introduced into the dispersing zone is in an amount of from about 15 to about 30 vol. %, based on the total volume of liquid and gas.

18. The process according to claim 13, wherein the carbonylation is conducted in the presence of a catalyst continuously introduced into the dispersing zone.

19. The process according to claim 18, wherein the catalyst comprises a transition metal compound.

20. The process according to claim 19, wherein the co-reactant comprises hydrogen gas.

21. The process according to claim 18, wherein the co-reactant is part of the liquid and is selected from water, $H_2S$, alcohols, thiols, and mixtures thereof.

22. The process according to claim 21, wherein the catalyst comprises an acidic catalyst.

23. The process according to claim 22, wherein the acidic catalyst comprises gaseous $BF_3$.

24. The process according to claim 22, wherein the co-reactant comprises a compound of formula $HYR^3$, wherein Y is O or S; and $R^3$ is H, hydrocarbyl or substituted hydrocarbyl; and carbonylation of the polymer is by attachment of groups of formula —CO—$YR^3$.

25. The process according to claim 24, wherein the starting polymer comprises unsaturated hydrocarbon polymer.

26. The process according to claim 24, wherein the co-reactant has a $pK_a$ of less than about 12.

27. The process according to claim 24, wherein Y is O and $R^3$ is substituted aryl.

28. The process according to claim 22, wherein the dispersing zone is a tubular dispersing zone comprising at least one static mixer.

29. The process according to claim 22, wherein the dispersing zone is a tubular dispersing zone comprising a plurality of serially disposed, closely spaced static mixers, the mixers having successively smaller diameters from entry to exit of the zone.

30. The process according to claim 29, wherein the blending zone is a tubular blending zone comprising at least one static mixer.

31. The process according to claim 22, further comprising continuously passing the liquid-gas solution from the blending zone to a soaking zone operated with essentially no mixing and under carbonylation conditions to permit further carbonylation before recovering the carbonylated polymer.

* * * * *